United States Patent
Johnston et al.

(10) Patent No.: US 7,189,961 B2
(45) Date of Patent: Mar. 13, 2007

(54) SCANNING BEAM DEVICE WITH DETECTOR ASSEMBLY

(75) Inventors: Richard S. Johnston, Sammamish, WA (US); Charles D. Melville, Issaquah, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 11/065,224

(22) Filed: Feb. 23, 2005

(65) Prior Publication Data

US 2006/0186325 A1 Aug. 24, 2006

(51) Int. Cl.
*G01J 1/04* (2006.01)
*H01J 3/14* (2006.01)
*A61B 6/00* (2006.01)

(52) U.S. Cl. ............... 250/234; 250/227.11; 250/225; 600/473; 600/476

(58) Field of Classification Search ............... 250/234, 250/227.11, 239, 216, 225; 600/473, 476, 600/478
See application file for complete search history.

(56) References Cited

U.S. PATENT DOCUMENTS

| | | | |
|---|---|---|---|
| 4,527,893 A | 7/1985 | Taylor | |
| 4,677,683 A | 6/1987 | Pferd et al. | |
| 4,767,911 A | 8/1988 | Maram | |
| 4,919,508 A | 4/1990 | Grace et al. | |
| 4,972,344 A | 11/1990 | Stoddard | |
| 4,991,971 A | 2/1991 | Geary et al. | |
| 5,011,259 A | 4/1991 | Lieber et al. | |
| 5,172,685 A | 12/1992 | Nudelman | |
| 5,317,148 A | 5/1994 | Gray et al. | |
| 5,400,267 A | 3/1995 | Denen et al. | |
| 5,625,451 A | 4/1997 | Schiff et al. | |
| 5,681,307 A | 10/1997 | McMahan | |
| 5,693,042 A | 12/1997 | Boiarski et al. | |
| 5,727,098 A | 3/1998 | Jacobson | |
| 5,742,718 A | 4/1998 | Harman et al. | |
| 5,764,874 A | 6/1998 | White | |

(Continued)

FOREIGN PATENT DOCUMENTS

WO WO 2000/75712 12/2000

OTHER PUBLICATIONS

"Engineering Study of an Endoscope Design." *Human Interface Technology*, <www.hitl.washington.edu/research/endoscope/> (Sep. 30, 2004).

(Continued)

*Primary Examiner*—Kevin Pyo
(74) *Attorney, Agent, or Firm*—Townsend and Townsend and Crew LLP

(57) ABSTRACT

The present invention provides scanning beam devices that have one or more detectors positioned within a housing of the device. The detector(s) may be disposed anywhere within the housing to receive light reflected from the target area. In one embodiment, an optical assembly of the device transmits a first portion of the reflected light to a scanning element, and a second portion of the reflected light to the detectors. In another embodiment, the optical assembly is configured to transmit substantially all of the reflected light to the scanning element. In such embodiments, the scanning element will be adapted to allow the light to exit the scanning element and impinge on the detector(s) within the housing.

32 Claims, 7 Drawing Sheets

U.S. PATENT DOCUMENTS

| | | | |
|---|---|---|---|
| 5,768,461 | A | 6/1998 | Svetkoff et al. |
| 5,822,486 | A | 10/1998 | Svetkoff et al. |
| 5,870,511 | A | 2/1999 | Sawatari et al. |
| 5,907,425 | A | 5/1999 | Dickensheets et al. |
| 5,933,240 | A | 8/1999 | Jurca |
| 6,046,720 | A | 4/2000 | Melville et al. |
| 6,091,067 | A | 7/2000 | Drobot et al. |
| 6,211,904 | B1 | 4/2001 | Adair et al. |
| 6,222,628 | B1 | 4/2001 | Corallo et al. |
| 6,294,775 | B1 | 9/2001 | Seibel et al. |
| 6,327,493 | B1 | 12/2001 | Ozawa et al. |
| 6,329,778 | B1 | 12/2001 | Culp et al. |
| 6,388,641 | B2 | 5/2002 | Tidwell et al. |
| 6,402,743 | B1 | 6/2002 | Orszulak et al. |
| 6,411,838 | B1* | 6/2002 | Nordstrom et al. ......... 600/476 |
| 6,492,962 | B2 | 12/2002 | Melville et al. |
| 6,498,948 | B1 | 12/2002 | Ozawa et al. |
| 6,563,105 | B2 | 5/2003 | Seibel et al. |
| 6,564,087 | B1 | 5/2003 | Pitris et al. |
| 6,626,834 | B2 | 9/2003 | Dunne |
| 6,627,903 | B1 | 9/2003 | Hirayanagi |
| 6,666,860 | B1 | 12/2003 | Takahashi |
| 6,845,190 | B1 | 1/2005 | Smithwick et al. |
| 2001/0030744 | A1 | 10/2001 | Chang |
| 2001/0055462 | A1* | 12/2001 | Seibel ........................ 385/147 |
| 2002/0064341 | A1 | 5/2002 | Fauver et al. |
| 2002/0131052 | A1 | 9/2002 | Emery |
| 2003/0010826 | A1 | 1/2003 | Dvorkis et al. |
| 2003/0086161 | A1 | 5/2003 | Harris |
| 2003/0179428 | A1 | 9/2003 | Suzuki et al. |
| 2004/0076319 | A1 | 4/2004 | Fauver et al. |
| 2004/0113059 | A1 | 6/2004 | Kawano et al. |
| 2004/0254474 | A1* | 12/2004 | Seibel et al. ................ 600/473 |
| 2006/0072843 | A1 | 4/2006 | Johnston et al. |
| 2006/0072874 | A1 | 4/2006 | Johnston et al. |
| 2006/0138238 | A1 | 6/2006 | Johnston et al. |

OTHER PUBLICATIONS

"Micro-Optical Fabrication of a Fiber Scanning System," *Human Interface Technology*, <www.hitl.washington.edu/research/endoscope/> (Sep. 29, 2004).

"Q factor" from *Wikipedia, The Free Encyclopedia*, May 20, 2004, <www.en.wikipedia.org/wiki/Q_factor> (Jun. 22, 2004).

Andersen, J. and Seibel, E., "Real-Time Hazard Detection Via Machine Vision for Wearable Low Vision Aids," *5th Intl. Symposium on Wearable Computers, Proceedings of IEEE ISWC*2001, pp. 182-183.

Brown, C. et al., "A Novel Design for a Scanning Fiberoptic Endoscope," *Human Interface Technology Laboratory, University of Washington*, Seattle, WA 98195-2142 and Mechanical Engineering Department, University of Washington, Seattle, WA 98195.

Brown, C. et al., "Mechanical Design and Analysis for a Scanning Fiber Endoscope," *ASME International Mechanical Engineering Congress and Exposition*, New York, NY, Nov. 11-16, 2001, BED-vol. 50:165-166.

Fauver, M. et al., "Microfabrication of Fiber Optic Scanners," In Proceedings of Optical Scanning II, *SPIE*, 4773:102-110 (2002).

Johnson, B., "Grating Shrinks Endoscope," *Photonics Spectra*, (Oct. 2003), <www.photonics.com/spectra/applications/QX/ASP/aoaid.335/QX/read.htm> (Sep. 30, 2004).

Johnston, R. et al., U.S. Appl. No. 11/094,017, filed Mar. 29, 2005.

Piyawattanametha, W. et al., "A MEMS Non-Interferometric Differential Confocal Scanning Optical Microscope," *Transducers 2001 & Eurosensors XV, Munich, Germany*, Jun. 10-14, 2001, 4 pages.

Seibel, E. and Smithwick, Q., "Single Fiber Flexible Endoscope: General Design for Small Size, High Resolution, and Wide Field of View," *Proceedings of the SPIE, Biomonitoring and Endoscopy Technologies*, 4158:29-39 (2001).

Seibel, E., and Smithwick, Q., "Unique Features of Scanning Fiber Optical Endoscopy," presented at the 2000 Annual Fall Meeting of the Biomedical Engineering Society, BMES, Seattle, WA, Oct. 12-14, 2000, *Annals of Biomedical Engineering*, vol. 28, Suppl. 1, S-40.

Seibel, E. et al., "Prototype Scanning Fiber Endoscope," presented at *SPIE BiOS*, San Jose, CA (Jan. 2002).

Seven, R., "At the UW Hit Lab, There's Virtue in Virtual Reality," *Seattletimes.com*, Apr. 11, 2004, <www.seattletimes.nwsource.com/pacificnw/2004/0411/cover.html> (Jun. 9, 2004).

Smithwick, et al., "Modeling and Control of a Resonant Fiber Scanner for Laser Scanning Display or Aquisition," *Department of Aeronautics and Astronautics and Human Interface Technology Laboratory, University of Washington*, PowerPoint presentation (33 pages), May 22, 2003.

Smithwick, et al., "Modeling and Control of the Resonant Fiber Scanner for Laser Scanning Display or Acquisition," *SID 03 Digest*, 34:1455-1457 (2003).

Smithwick, Q. et al., "Control Aspects of the Single Fiber Scanning Endoscope," Proceedings of SPIE Volume 4253 International Symposium on BIOS 2001, *Optical Fibers and Sensors for Medical Applications*, 4253:176-188.

Smithwick, Q. et al., "Depth Enhancement Using a Scanning Fiber Optical Endoscope," Optical Biopsy IV, Ed. Robert R. Alfano, *Proc. of SPIE*, vol. 4613:222-233 (2002).

Tearney, G. et al., "Scanning Single-Mode Fiber Optic Catheter-Endoscope for Optical Coherence Tomography," *Optics Letters*, 21(7):543-545 (Apr. 1, 1996).

Wang, W. et al., "Development of an Optical Waveguide Cantilever Scanner," Opto-Ireland 2002: Optics and Photonics Technologies and Applications, *Proc. SPIE*, 4876:72-83 (2003).

Wang, W. et al., "Micromachined Optical Cantilever as a Resonant Optical Scanner," *Sensors and Actuators A*, 102:165-175 (2002).

* cited by examiner

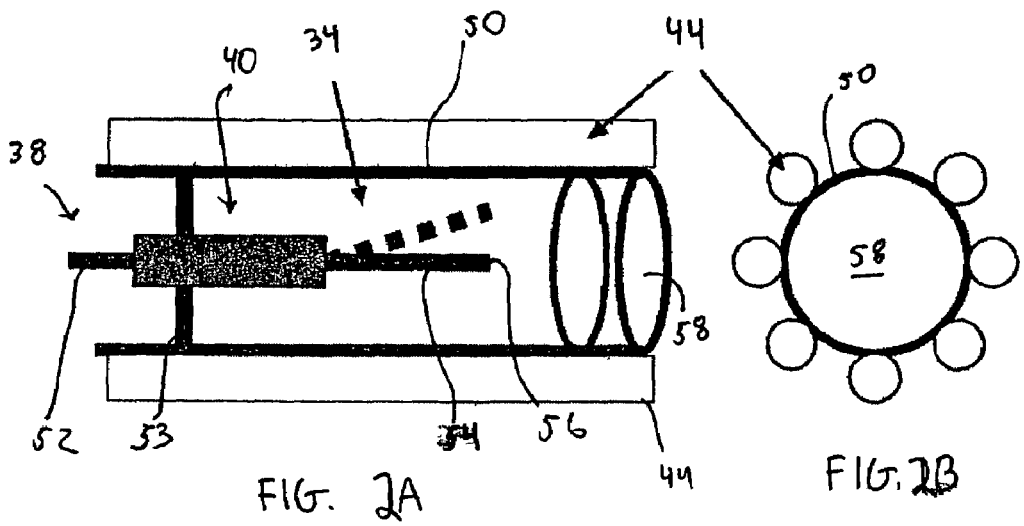
FIG. 2A
FIG. 2B
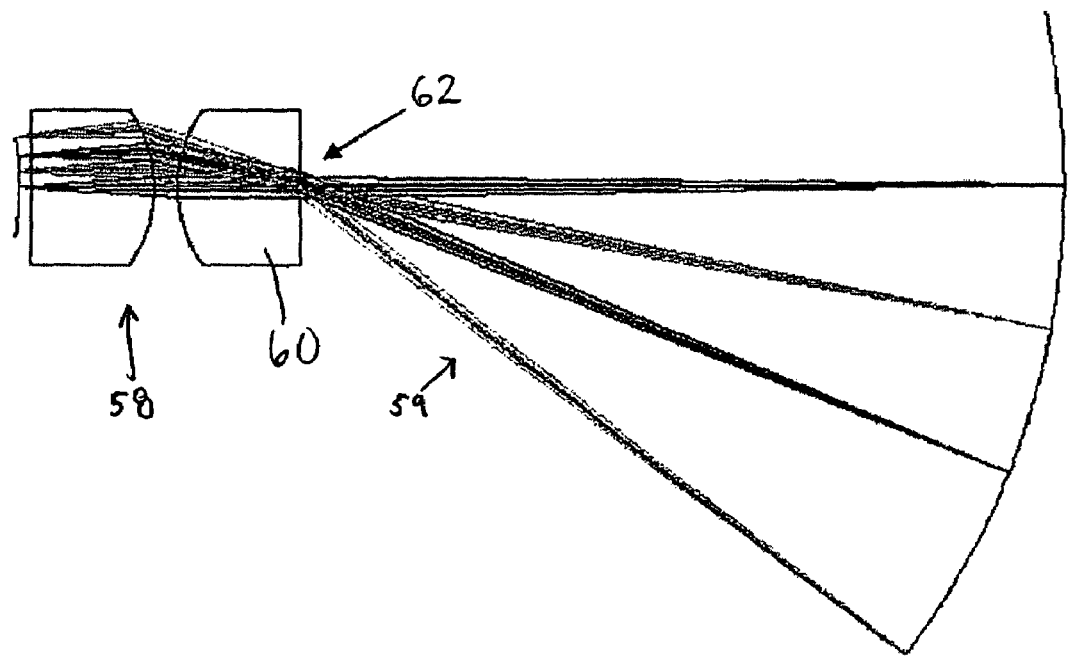
FIG. 3A

Position a scanning beam device adjacent a target area (Step 80)

Deliver light from a scanning element through an optical assembly onto the target area (Step 82)

Reflect light from the target area back into the optical assembly (Step 84)

Deliver a first portion of the light reflected from the target area onto the scanning element (Step 86)

Focus or scatter a second portion of the light reflected onto the one or more detectors in the housing of the scanning beam device or scatter the second portion of the light reflected from the target area within the housing of the scanning beam device so that the second portion of the light reflected from the target area impinges on the one or more detectors in the housing of the scanning beam device (Step 88)

FIG. 7

Position a scanning beam device adjacent a target area (Step 90)

Delivering light from a distal end of the optical fiber through the optical assembly and over a target area (Step 92)

Receiving reflected light from the target area back into the optical assembly, wherein the optical assembly focuses substantially all of the light reflected from the target area into the core (and cladding) of the optical fiber (Step 94)

Allowing the reflected light to exit the cladding of the optical fiber so that it can be detected by the one or more detectors in the housing (Step 96)

FIG. 8

SCANNING BEAM DEVICE WITH DETECTOR ASSEMBLY

BACKGROUND OF THE INVENTION

The present invention relates generally to scanning methods and scanning beam devices. More particularly, the present invention provides improved optical assemblies and improved optical fibers that allow for placement of one or more light detectors within a housing of the scanning beam device.

Conventional endoscopes generally have a separate detector element in its distal tip for every pixel of resolution for the image of the target area. The detector element may be one optical fiber in a fiber bundle or one pixel in a charge coupled device (CCD) or complementary metal oxide semiconductor (CMOS) image detector chip. As the resolution is increased, the number of detector elements must be increased, thus increasing the diameter of the endoscope. Thus, in order to reduce a size of the endoscope, conventional endoscopes must sacrifice image quality, the quality of the optical assembly, and/or durability.

One proposed endoscope that overcomes some of the drawbacks of the conventional endoscope has been developed by the University of Washington. The endoscope developed by the University of Washington is a scanning beam device that uses a single, cantilevered optical fiber to scan an illumination spot over the target area in a one or two dimensional scan pattern. Light reflected from the target area is sequentially captured by one or more light detectors that are coupled to a distal end of the scanning beam device. Typical detectors include a photo detector, or an optical fiber that relays light to a photo detector that is remote from the distal end of the scanning beam device. The detector response is then used to determine the brightness of the small portion of the image that corresponds to the small area illuminated by the illumination spot at that given point in time during the scanning pattern.

If a monochromatic image of the target area is desired, only a single light detector is needed. However, if it is desired to capture a color image or to perform advance features such as specular reflection reduction, multiple light detectors may be coupled to the distal end of the scanning beam device to collect the back reflected light from the target area.

Advantageously, in contrast to conventional endoscopes, the scanning beam device of the present invention needs only a single detector to function properly, and the scanning beam devices of the present invention do not require additional detector elements to increase the resolution of the resultant image. Consequently, the scanning beam devices of the present invention are able to provide a high resolution image while maintaining a small diameter housing. Because the diameter of the distal portion of the housing is smaller than conventional imaging devices, the scanning beam devices of the present invention are able to provide high resolution images of body lumens that may not be accessible by conventional endoscopes.

To achieve a good signal to noise ratio (SNR)—and thus the clearest images of the target area—Applicants have found that it is desirable to have the detector(s) receive as much reflected light from the target area as possible. Simulations have shown that the reflected light tends to be highest closest to the center of the scanning beam device, and that there is less reflected light at distances farther from the center of the scanning beam device. To maximize the reflected light from the target area, it was thought that it would be best to maximize the surface area of the detector(s) and position the sensor(s) as near to the center of the scanning beam device as possible.

Therefore, what is needed are scanning beam devices that are able to position the detector assembly within the housing so as to receive diffused reflected light.

BRIEF SUMMARY OF THE INVENTION

The present invention provides improved methods and devices of scanning an illumination spot over a target area and collecting the back reflected light. The methods and devices of the present invention typically provide a modified optical assembly that allows the illumination to be directed from a scanning element to the target area and directs the back reflected light from the target area to one or more detectors that are spaced from the scanning element.

Applicants have found that if the optical assembly is not "modified" that because of the reversible nature of the optical assembly, substantially all of the back reflected light is directed back into portions of the scanning element. Thus, if the optical assembly is not modified, only a minimal amount of reflected light would impinge upon a detector that is spaced apart from the scanning element.

Modification of the optical assembly may be carried out in a variety of different ways. For example, a shape of one or more surfaces of a portion of the optical assembly may be changed so as to scatter the back reflected light into the housing or direct the back reflected light to the detectors within a housing of the scanning beam device. Alternatively, one or more surface of a portion of the optical assembly may be frosted or otherwise treated to scatter the light into the housing of the scanning beam device. In yet other embodiments, the optical assembly may be comprised of a material that directs some of the back reflected light to the light detectors and some of the back reflected light to the scanning element. For example, the optical assembly may be comprised of a birefringent material so as to deliver one polarization of light back to the scanning element, and other polarization of light to other portions of the housing. As can be appreciated, the above modifications are merely examples, and other modifications to the optical assembly which achieve the desired scattering/focusing of the light are also encompassed by the present invention.

In one aspect, the present invention provides a scanning beam device that comprises a scanning element coupled to a drive assembly. A housing surrounds the drive assembly and the scanning element. One or more detectors are positioned within the housing and spaced from the scanning element. An optical assembly is disposed substantially at a distal end of the housing assembly. The optical assembly is adapted to direct light from the scanning element to a target area distal of the optical assembly and is adapted to direct at least a portion of light reflected from the target area to the one or more detectors and a portion of the light reflected from the target area back to the scanning element.

In exemplary embodiments, the device is in the form of an endoscope in which the housing comprises a substantially tubular body. The detectors may be positioned anywhere within the substantially tubular body, but are typically coupled directly to the substantially tubular housing. In other configurations, the one or more detectors are positioned within the housing and coupled to the distal optical assembly. In yet other configurations, the one or more detectors are positioned around the drive assembly (e.g., coupled to a collar around the drive assembly).

The optical assemblies of the present invention typically comprise a first portion that is adapted to direct a first portion of the light reflected from target area to the scanning element, and a second portion that is configured to direct a second portion of the light reflected from the target area to the one or more detectors.

In one preferred configuration, the first portion of the optical assembly is a central area of the optical assembly around a longitudinal axis of the optical assembly and the second portion of the optical assembly is an annular area of the optical assembly that surrounds the central area. The second portion of any lens or optical element of the optical assembly may be modified to provide the desired characteristics to the optical assembly. However, in preferred embodiments, a distal most lens surface in the optical assembly is modified (e.g., shape is changed relative to the shape of the first portion, frosted, material is different).

In one configuration, one or more diffractive elements may be positioned in the optical path of the second portion, such that any light emitted through the second portion will be diffracted by the diffractive element in a desired direction (e.g., away from the scanning element and/or to the one or more detectors).

In another specific configuration, the scanning element delivers a linearly polarized light to the target area. The light reflected from the target area comprises multiple polarization states depending on the nature of the target area. At least one element of the optical assembly may comprise a birefringent material that directs light reflected from the target area that is of a first polarization to the scanning element and light reflected from the target area that is of a second polarization to the one or more detectors or merely scatters the second polarization light in the housing.

In another aspect, the present invention provides a method of scanning a target area. The method comprises positioning a scanning beam device adjacent the target area. The scanning beam device comprises a housing that houses an optical assembly, a scanning element, and one or more detectors. Light is delivered from the scanning element through the optical assembly and onto the target area. Light reflected from the target area is received back into the optical assembly, and the optical assembly delivers a first portion of the light reflected from the target area onto the scanning element. A second portion of the light reflected is focused onto the one or more detectors in the housing of the scanning beam device or the second portion of the light reflected from the target area is scattered within the housing of the scanning beam device so that the second portion of the light reflected from the target area impinges on the one or more detectors in the housing of the scanning beam device.

The first portion of the reflected light is typically delivered through a first portion of the optical assembly and the second portion of the light reflected from the target area is delivered through a second portion of the optical assembly. In one configuration, the second portion of the optical assembly comprises a frosted surface, surface shape that differs from the first portion of the optical assembly, or includes one or more diffractive elements.

In another aspect, the present invention provides devices and methods that direct reflected light from the target area back into the scanning element and removes the reflected light from the scanning element and directs the reflected light onto the one or more detectors.

In one embodiment, the present invention provides a scanning beam device that comprises an optical fiber that includes a core and cladding. A drive assembly is coupled to the optical fiber. A housing surrounds the drive assembly and the optical fiber. One or more detectors are positioned within the housing and spaced from the optical fiber to detect light that is forced or otherwise allowed to leave the cladding of the optical fiber. An optical assembly is disposed substantially at a distal end of the housing assembly. The optical assembly is configured to direct light reflected from the target area to the core (and cladding) of the optical fiber.

In a preferred embodiment, the scanning beam device is in the form of an endoscope. The one or more detectors are positioned within the housing proximal to the optical assembly (e.g., coupled to a proximal surface of the optical assembly, coupled to the housing, or disposed around the drive assembly).

In order to allow the light to exit the cladding so as to allow the reflected light to impinge on the detector(s), a shape of at least a portion of the optical fiber may be modified. In some embodiments, material may be added to the outer surface of the cladding (e.g., one or more bumps) to force light to exit the cladding. In other embodiments, at least a portion of the cladding of the optical fiber is etched so as to force the light to exit the cladding. The optical fiber may comprise a sloped transition region between an etched portion of the optical fiber and an un-etched portion of the optical fiber. In such configurations, the reflected light exits the cladding of the optical fiber through the transition region. A slope of the transition region is angled relative to a longitudinal axis of the optical fiber and may be any desired angle (e.g., less than 90 degrees, 90 degrees, or more than 90 degrees). Applicants believe that a larger slope of the transition region will allow more light to exit the cladding and impinge on the detector(s).

In another embodiment, the present invention provides a method of scanning a target area. The method comprises positioning a scanning beam device adjacent the target area, the scanning beam device comprising a housing that houses an optical assembly, an optical fiber comprising a core and cladding, and one or more detectors. Light is delivered from a distal end of the optical fiber through the optical assembly and over a target area. Light reflected from the target area is received back into the optical assembly, wherein the optical assembly focuses substantially all of the light reflected from the target area into the core (and cladding) of the optical fiber. The reflected light is forced or otherwise allowed to exit the cladding of the optical fiber so that it can be detected by the one or more detectors in the housing.

Other aspects, objects and advantages of the invention will be apparent from the detailed description that follows.

BRIEF DESCRIPTION OF THE DRAWINGS

FIG. 2A shows a scanning beam device that comprises a plurality of optical fibers outside of the housing of the scanning beam device.

FIG. 2B is an end view of FIG. 2A.

FIG. 3A schematically illustrates a portion of an optical assembly in which light is emitted only through a central portion of a distal most lens of the optical assembly.

FIG. 7 is a block diagram of a simplified method encompassed by the present invention.

FIG. 8 is a block diagram of a simplified method encompassed by the present invention.

DETAILED DESCRIPTION OF THE INVENTION

The present invention provides methods and scanning beam devices that scan an illumination spot over a target area and capture reflected light from the target area to generate an image of the target area.

Scanning beam systems of the present invention include a scanning beam device and a base station for controlling the scanning beam device. The scanning beam devices of the present invention may take on a variety of forms, but are typically in the form of a flexible or rigid endoscope, catheter, fiberscope, microscope, or a boroscope. The scanning beam devices of the present invention may be a limited use device (e.g., disposable device) or a multiple-use device. If the device is for medical use, the scanning beam devices of the present invention will generally be sterile, either being sterilizable or being provided in hermetically sealed package for use.

The scanning beam devices of the present invention include a scanning element for scanning a beam of light onto a target area. The scanning element preferably comprises a single, cantilevered optical fiber, but in other embodiments, the scanning element may take the form of mirrors, such as microelectomechanical system (MEMS), galvanometer, a polygon, multiple optical elements moved relative to each other, or the like. While the remaining discussion focuses on scanning fiber devices that are used for acquiring images of a target site, it will be appreciated that the present invention also encompasses the other aforementioned devices.

Figure 1:
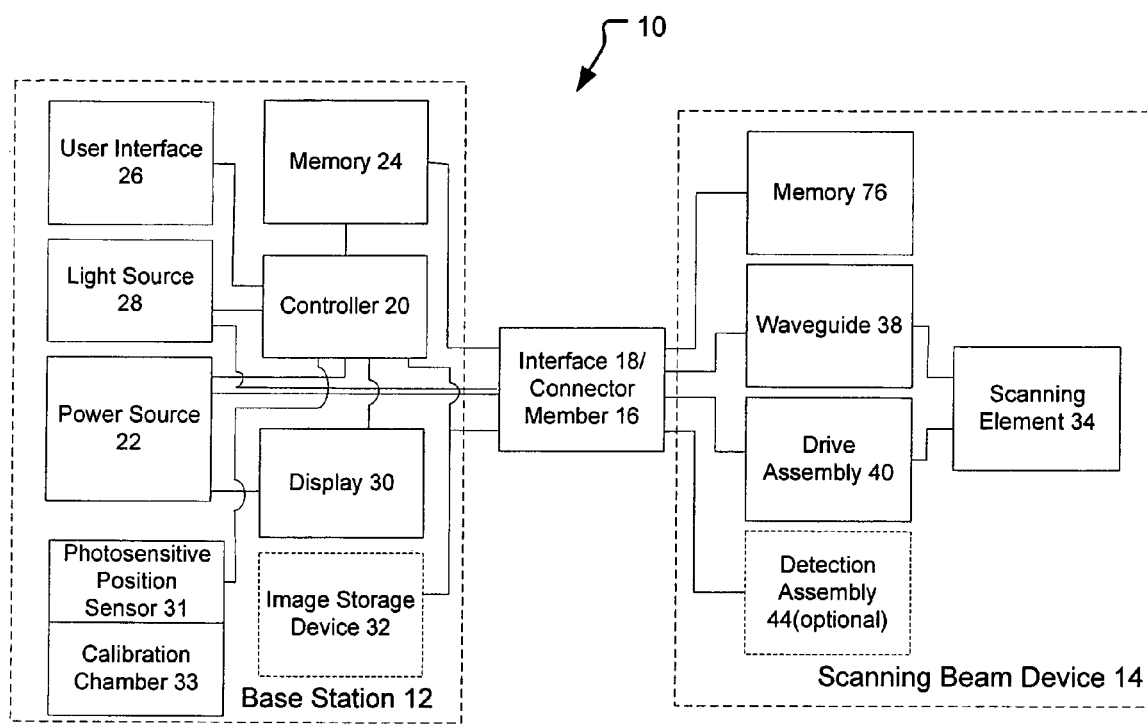
FIG. 1 schematically illustrates a scanning beam system of the present invention that comprises a base station and a scanning beam device.

FIG. 1 schematically illustrates one scanning beam system 10 that is encompassed by the present invention. The scanning beam system 10 includes a base station 12 and a scanning beam device 14. The scanning beam device 14 includes a connector member 16 that is configured to mate with an input interface 18 on the base station. Coupling of the connector member 16 to the input interface 18 may create a power path, drive signal path, detector path, illumination path, and/or data communication path between elements of the base station 12 and related elements of the scanning beam device 14.

As shown in FIG. 1, base station 12 typically includes a controller 20 that has one or more microprocessors and/or one or more dedicated electronics circuits which may include a gate array (not shown) which may control the actuation of the scanning beam device 14 and generation of the images. The controller 20 may also include scanner drive electronics, detector amplifiers and A/D converters (not shown). The drive electronics in the controller and the software modules stored in memory may be used to provide a customized control routine for the scanning beam device 14. As will be appreciated by those of skill in the art, the methods of the present invention may be carried out by the software modules and/or by the electronics hardware in the controller.

Controller 20 is in communication with a plurality of elements within the base station 12 via a communication bus (not shown). The communication bus typically allows for electrical communication between controller 20, a power source 22, memory 24, user interface(s) 26, one or more light sources 28, one or more output displays 30, and a photosensitive position sensor 82 that is coupled to a calibration chamber 80. Optionally, if the scanning beam device 14 includes a detector assembly, the base station 12 may include a separate image storage device 32 in communication with controller 20. In alternative embodiments, the image storage device 32 may simply be a module within memory 24. As can be appreciated, the base stations 12 of the present invention will vary, and may include fewer or more elements than illustrated in FIG. 1.

Depending on the particular configuration of the scanning beam device 14, the light source 28 may emit a continuous stream of light, modulated light, or a stream of light pulses. Base station 12 may comprise a plurality of different light sources 28 so as to be able to operate different scanning beam devices that have different illumination capabilities. The light sources 28 may include one or more of a red light source, blue light source, green light source (collectively referred to herein as a "RGB light source"), an IR light source, a UV light source, and/or a high intensity laser source (typically for a therapeutic scanning beam device). The light sources 28 themselves may be configured to be switchable between a first mode (e.g., continuous stream) and a second mode (e.g., stream of light pulses). For ease of reference, other conventional elements in the light source are not shown. For example, if a RGB light source is used, the light sources may include a combiner to combine the different light before it enters the scanning element of the scanning beam device 14.

Memory 24 may be used for storing the software modules, look-up tables, and algorithms that control the operation and calibration of the scanning beam device 14. The control routine used by the controller 20 for controlling the scanning beam device 14 will typically be configurable so as to match the operating parameters of the attached device (e.g., resonant frequency, voltage limits, zoom capability, color capability, etc.). As noted below, memory 24 may also be used for storing the image data received from the detector assembly 44 of the scanning beam device, remapping look-up tables and algorithms, remapped drive signals, parameters of the scanning beam device, etc.

For ease of reference, other conventional elements in the base station 12 are not shown. For example, embodiments of the base stations 12 of the present invention will typically include conventional elements such as amplifiers, D/A converters and A/D converters, clocks, waveform generators, and the like. A more complete description of the base stations, and its interaction with the scanning beam devices are more fully described in commonly owned U.S. patent application Ser. No. 10/956,241, entitled "Remapping Methods to Reduce Distortions in Images," filed Oct. 1, 2004 and U.S. patent application Ser. No. 10/956,473, entitled "Configuration Memory for a Scanning Beam Device," filed Oct. 1, 2004, and U.S. patent application Ser. No. 11/021,981, entitled "Methods of Driving a Scanning Beam Device to Achieve High Frame Rates," filed on Dec. 23, 2004, the complete disclosures of which are incorporated herein by reference.

The scanning beam devices 14 of the present invention will includes a scanning element 34 for delivering and scanning a beam of light onto a target area. A waveguide 38, typically in the form of an optical fiber (which may be a continuation of scanning element 34), is optically coupled to the light source(s) so as to deliver illumination from the light source 28 to the scanning element 34. A driving assembly 40 is coupled to the scanning element 34 and is adapted to actuate the scanning element 34 according to a drive signal received from the controller 20. Optionally, the scanning beam device 14 may include a non-volatile memory 39 for storing identification data or parametric data of the scanning beam device 14. While not shown in FIG. 1, the scanning beam device 14 will typically include an optical assembly that directs and focuses the light directed out of the scanning element 34.

In a preferred embodiment, the scanning element 34 is a cantilevered optical fiber. As shown in a simplified embodiment of FIG. 2A, the optical fiber scanning element 34 comprises a proximal portion 52 and a distal portion 54 that comprises a distal tip 56. Optical fiber 34 is typically fixed along at least one point of the optical fiber so as to be cantilevered such that the distal portion 54 is free to be deflected. In such an embodiment, the proximal portion 52 of the optical fiber is the waveguide 38 and will transmit light from light source 28 (FIG. 1). As can be appreciated, in other embodiments, a separate waveguide 38 may be optically coupled to the proximal portion 52 of the optical fiber so that light from light source 28 will be directed into the optical fiber 34 and out of the distal tip 56.

The optical fiber 34 may have any desired dimensions and cross-sectional profile. The optical fiber 34 may have a symmetrical cross-sectional profile or an asymmetrical cross-sectional profile, depending on the desired characteristics of the device. An optical fiber 34 with a round cross-sectional profile will have substantially the same resonance characteristics about any two orthogonal axes, while an optical fiber with an asymmetric cross-sectional profile (e.g., ellipse) will have different resonant frequencies about the major and minor axes. If desired, the optical fiber 34 may be linearly or non-linearly tapered along its longitudinal length.

To achieve the deflection of the distal portion 54 of the optical fiber, the cantilevered distal portion 54 of the optical fiber 34 will be coupled to drive assembly 40. Drive assembly 40 will typically drive the cantilevered distal portion 54 in a one or two dimensional scan pattern at a frequency that is within a Q-factor of the resonant frequency of the distal portion of the optical fiber, and preferably at its mechanical or vibratory resonant frequency (or harmonics of the resonant frequency). As can be appreciated, the scanning element 34 does not have to be driven at substantially the resonant frequency, but if the scanning element 34 is not scanned at its resonant frequency, a larger amount of energy will be required to provide the desired radial displacement for the scan pattern. In one preferred embodiment, the drive assembly is a piezoelectric driving assembly. A drive signal from controller 20 delivers a desired signal to the drive assembly 40. The drive signal causes the piezoelectric drive assembly to deflect the distal tip 56 of the optical fiber 34 so that the illumination spot is scanned in a desired scan pattern. While preferred drive assemblies are piezoelectric assemblies, in alternative embodiments, the drive assembly 40 may comprise a permanent magnet, a electromagnet, an electrostatic drive, a sonic drive, an electro-mechanical drive, or the like.

Referring now to FIGS. 2A and 2B, the scanning beam device 14 of the present invention may include a housing 50 that houses the optical fiber 34 and drive assembly 40. Drive assembly 40 may be stabilized within housing 50 via one or more collars 53. An optical assembly 58 that comprises one or more lenses may be disposed at or near a distal end of the housing 50. Optical assembly 58 will be spaced distally from the distal end 56 of the optical fiber 34 so as to focus the imaging light, to provide better resolution, and/or an improved FOV for the scanning beam device 14. One or more of the lenses of the optical assembly 50 may be fixed relative to the scanning distal end 56 of the optical fiber and/or one or more of the lenses of the optical assembly 58 may be movable relative to the housing 50.

A detector assembly 44 used with the scanning beam device 14 of the present invention may comprise one or more detectors that are in communication with the controller 20 (FIG. 1). The detectors are typically coupled to the controller through an amplifier and A/D converter (not shown). The controller (or drive electronics within the controller) may provide a synchronization pulse to provide a timing signal for the data acquisition by the detectors of the detector assembly 44. Additionally or alternatively, a separate clock circuit (not shown) may be used to correspond the detected light to the time points in the scan pattern.

The detector assembly 44 may comprise one of more individual detectors to receive light backscattered from the target area. For example, the detector assembly may comprise a light detector (such as a photodetector) that produces electrical signal that are conveyed through leads (not shown) to the base station 12. Alternatively, the detector assembly 44 may comprise one or more collector fibers that transmit light reflected from the target area to photodetectors in the base station 12.

The detector assembly 44 shown in FIGS. 2A and 2B may be disposed anywhere on the housing 50 of the scanning fiber device, but will typically be positioned adjacent the distal portion 54 of optical fiber 34 so as to capture backscattered light reflected off of the target area. Applicants have found that in order to achieve the best signal to noise ratio (SNR), and thus produce the clearest images of the target area, it is desirable to have the detector assembly 44 receive as much of the reflected light as possible. Simulations have shown that the reflected light tends to be highest closest to the center of the scanning beam device 14. At distances farther from the center of the scanning beam device 14, there tends to be less reflected light. Thus, to maximize the reflected light from the target area, it was thought that it would be best to maximize the surface area of the detector(s) and position the sensor(s) as near to the center of the scanning beam device 12 as possible.

FIGS. 2A and 2B illustrate one potential detector assembly 44 configuration. In the illustrated configuration, the detector assembly 44 is attached around an outside perimeter of the housing 50 of the scanning fiber device 14 so that the detector assembly 44 does not impede the light transmission through the optical assembly 58. Such a configuration, however, increases a diameter of the distal portion of the scanning beam device 14. For example, if the scanning beam device housing 50 has a 1 mm diameter and 250 micron diameter detectors (e.g., optical fibers) are placed around the outside perimeter and if a 100 micron sheath (not shown) is used to cover the detector assembly 44, the largest radial dimension of the distal portion of the scanning beam device will be approximately 1.7 mm.

Figures 3B, 3C, 3D:
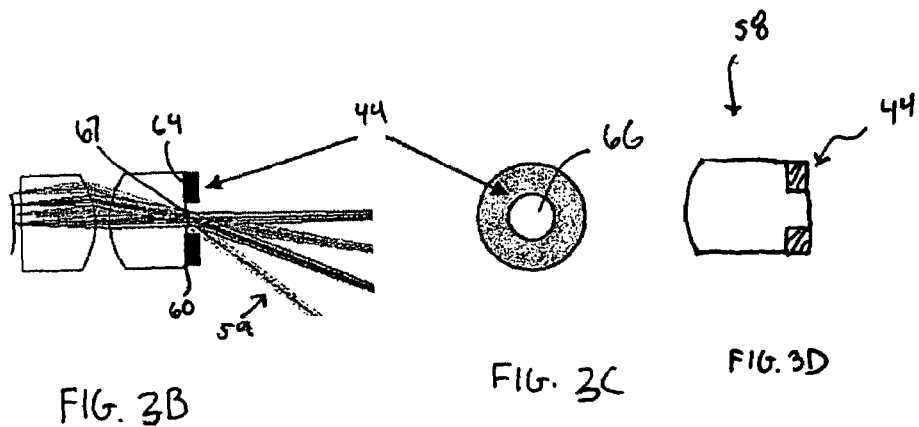
FIG. 3B illustrates the optical assembly of FIG. 3A with an annular shaped or donut shaped detector that is attached to an exterior surface of the distal most lens.
FIG. 3C is an end view of the optical assembly of FIG. 3B
FIG. 3D illustrates a distal most lens of an optical assembly that is shaped to receive an annular shaped detector, so that a distal most surface of the lens is substantially even with the distal most surface of the detector.

In order to reduce the radial dimension of the distal portion of the scanning beam device 12, it would be desirable to position the detector assembly 44 within the largest radial dimension (e.g., outside diameter) of housing 50. FIGS. 3A–3C illustrate one configuration that positions the detector assembly outside of housing 50 but within the largest radial dimension of housing 50 so as to maintain a smaller radial dimension of the scanning beam device. In such a configuration, the optical assembly 58 may be designed so that all of the light rays 59 emitted from the distal end 56 of the scanning element 34 will exit the distal-most lens 60 of the optical assembly 58 from a first portion 62 of the lens (e.g., central area around a longitudinal axis of the optical assembly 58). Because all of the light emitted from the scanning element is through the central, first portion 62 of the lens, a second portion 64 of the lens may be used to attach the detector assembly 44 (FIG. 3B).

As shown in FIGS. 3B and 3C, the detector assembly 44 may be annular shaped (e.g., donut shaped) with an opening 66 that is large enough to permit unobstructed delivery of light from the scanning element 34 to the target area. Generally, the opening 66 in the detector assembly 44 will correspond to the size and shape of the first portion 62 of the lens. In addition to being able to provide a smaller radial dimension, because the detector assembly 44 is positioned closer to a center of the scanning beam device, a larger amount of reflected light is received by the detector assembly 44.

In an alternative embodiment shown in FIG. 3D, unlike the embodiment of FIG. 3B, in which the distal most surface of distal-most lens 60 is offset from the distal most surface of detector assembly 44, a distal portion of the optical assembly 58 of FIG. 3D may be modified so that a distal most surface of the annular shaped detector assembly 44 is substantially even with a distal most surface of the optical assembly 58. In such an embodiment, a portion of the lens may be shaped (e.g., portion of the lens removed) so that the central, first portion 62 of the lens extends into the opening 66 of the annular shaped detector assembly 44 so that the detector assembly 44 is embedded into a portion of the optical assembly 58. Such an embodiment still allows light to exit the central, first portion 62 of optical assembly 58 while shortening the overall length of the optical assembly and the scanning beam device.

While the detector assembly 44 is shown having a radial dimension that is the same as or smaller than the largest radial dimension of the housing 50, the annular shaped detector assembly 44 may actually have a radial dimension that is greater than the largest radial dimension of the housing 50, if desired. While such an embodiment would increase the largest radial dimension of the scanning beam device, it would also increase the light detection capability of the device. Leads from the detector assembly 44 (not shown) may run along the outside or inside of housing 50 and be coupled to the controller. Optionally, a sheath (not shown) may be disposed over and around the detector assembly and leads so as to protect the detector assembly 44.

Figure 4:
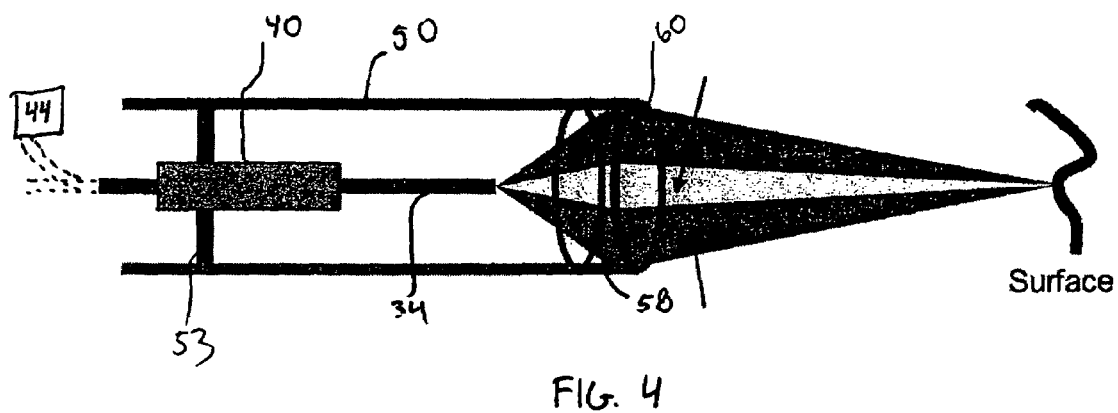
FIG. 4 schematically illustrates a reversible nature of an optical assembly of a scanning beam device of the present invention, in which the light reflected from the target area is focused back into the core of the scanning optical fiber.

FIG. 4 illustrates an embodiment that relies on the fact that the optical assembly 58 is "reversible," in that light rays reflected from the target area that hit the outside surface of the distal-most lens 60 will be focused back to the core of the optical fiber scanning element 34 (e.g., a confocal system). The light that enters the optical assembly over a larger numerical aperture (NA) than the light emitted will be outside the NA of the core of the optical fiber and will exit the core and enter the cladding of the optical fiber scanning element (e.g., a nonconfocal system). Light rays that are scattered by the tissue at the target area may scatter a small amount and may directly enter the cladding.

Simulations have shown that almost all of the reflected light from the target area that enters the optical assembly 58 will be captured by the core or cladding of the optical fiber scanning element. Consequently, it may be possible to use the scanning element as both a light emitter and a light detector. Once the light is captured by the optical fiber scanning element, the reflected light is typically removed from the core and cladding proximal to the piezoelectric drive assembly 40 and directed to a detector assembly 44 using known methods. Advantageously, because the optical fiber scanning element 34 is at or near a center of the scanning beam device 14, the optical fiber scanning element 34 will capture a large amount of the reflected light. Additionally, because the optical fiber scanning element is within the housing, such a configuration does not increase the radial dimensions of the scanning beam device. However, in order to use the scanning element 34 as a light detector, the reflected light must be removed from the core or cladding before it is lost from absorption in the cladding or exiting through the cladding. In such embodiments, even if the detector assembly is positioned within housing 50 and spaced from optical fiber scanning element 34 (e.g., coupled to housing 50, drive assembly 40, or the like), because of the reversible nature of the optical assembly, the detector assembly will not receive a sufficient amount of reflected light, since almost all of the reflected light is focused back into the core of the optical fiber scanning element 34.

Figure 5:
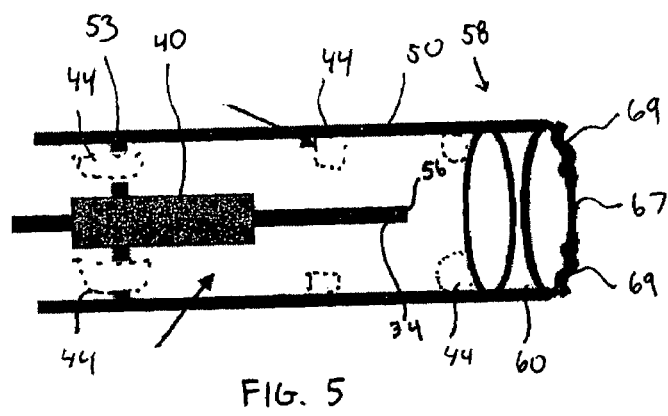
FIG. 5 illustrates a scanning beam device that comprises an optical assembly in which at least a portion of one surface of the optical assembly is modified so as to direct at least a portion of the light reflected from the target area away from the scanning element.

FIG. 5 provides an embodiment of the present invention which provides an optical assembly 58 that is adapted to allow the detector assembly 44 to be positioned within the housing 50 and spaced from the optical fiber scanning element 34. Advantageously, such embodiments allow the scanning beam device 14 to have a low-profile distal portion while still being able to collect a large amount of the reflected light from the target area.

FIG. 5 shows an embodiment which is similar to FIGS. 3A–3C in that light emitted from the distal tip 56 of the scanning element 34 is directed only through a first central portion 67 of the distal-most lens 60. As shown in FIG. 3B, light is emitted from the optical fiber scanning element 34 only through a central portion 67 of the distal-most lens 60. If the second portion 69 of distal most lens (e.g., annular portion around the central portion) is not modified (e.g., has a similar shape and/or optical characteristic as the first, central portion 67), the reflected light from the target area that hits the second portion 69 of the distal most lens 60 will be focused back to the optical fiber scanning element 34. In the embodiment of FIG. 5, the second portion 69 of the optical assembly 58, typically a distal surface of the distal-most lens 60 is modified so that the reflected light that hits the second portion 69 will be directed to somewhere else within the housing, and will not be directed back into the distal tip 56 of the optical fiber scanning element 34.

The reflected light coming through the second portion of the optical assembly could be focused to a different area within the housing 50 or merely scattered inside the housing of the housing 50 so as to substantially miss entering the core or cladding of the optical fiber scanning element 34. Thus, depending on the type of modification done to the optical assembly 58 the detector assembly 44 may be spaced from the scanning element 34. For example, in some embodiments an annular shaped detector assembly 44 may be attached to a proximal surface of the optical assembly 58 that is sized to allow the scanning element 34 to scan in its desired pattern, onto a wall of the housing 50, around the piezoelectric drive assembly 40 (e.g., coupled to collar 53), or any combination thereof. Alternatively, similar the embodiment of FIG. 3D, a proximal surface of a proximal most lens of the modified optical assembly 58 may be modified to allow a proximal surface of the proximal most lens to be substantially even with the proximal surface of the annular shaped detector assembly 44.

The one or more surfaces of the optical assembly 58 may be modified using any conventional method that will achieve the desired result. Some useful methods of modifying the optical assembly comprises changing a shape of a surface, frosting a surface such that reflected light will scatter when striking it, adding a diffractive element to the optical assembly, or any combination thereof.

While FIG. 5 shows a modification of a distal surface of the distal-most lens, it should be appreciated that other optical assemblies 58 may be designed so that all of the light emitted from the scanning element will cross a center point within an inner "surface" of a multi-element optical assembly. In such cases, an intermediate surface of the second portion of the optical assembly 58 could be modified. Alternatively, it may be possible to modify a proximal surface of the proximal-most optical element. Consequently, it is possible to modify any surface within the optical assembly 58 that is not illuminated by light emitted from the scanning element 34 during its scan pattern.

In other embodiments of the present invention, the optical assembly is modified to be non-reversible to different polarizations of light. While not shown in the figures, light emitted from the distal tip 56 of the optical fiber scanning element 34 may be a linearly polarized light. In such embodiments, at least one optical element of the optical assembly 58 comprises birefringent material. A birefringent material has a different index of refraction for two different polarizations of light. Consequently, the optical assembly 58 is reversible to the same polarization of light, but not reversible to different polarizations of light.

In such embodiments, the optical assembly 58 may be aligned so that the optical assembly focuses over a desired path. The light reflected from the surface of the target area will have multiple polarization states depending on the nature of the surface. As the reflected light re-enters the optical assembly 58, the fraction that has the same polarization as the scanned light will focus back to the core or cladding of the optical fiber scanning element 34, while the fraction that has a perpendicular polarization will focus to a different point within the housing, and can be collected by the detector assembly that is positioned within the housing to collect the reflected light. Similar to the embodiment of FIG. 5 the detector assembly can take the form of an annular shaped detector assembly 44 attached to a proximal surface of the optical assembly 34, onto a wall of the housing 50, onto the piezoelectric drive assembly 40, or any combination thereof.

Figure 6:
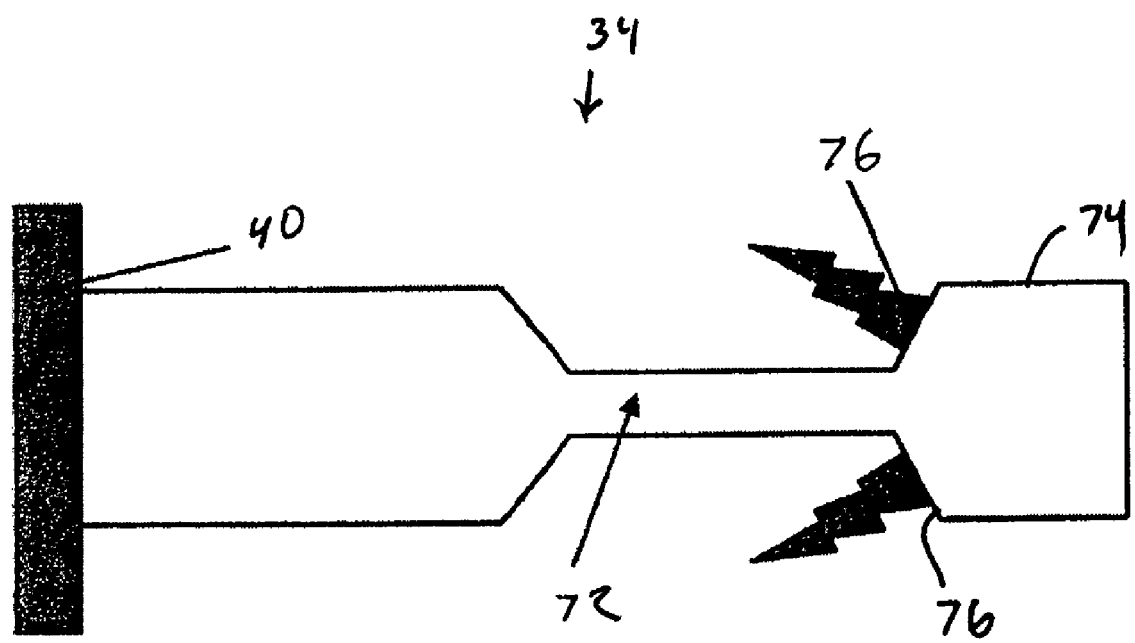
FIG. 6 illustrates a portion of an etched optical fiber that allows captured reflected light to exit the core and cladding so as to allow the reflected light to impinge on one or more detectors within the housing.

FIG. 6 illustrates one embodiment of an optical fiber scanning element 34 that is adapted to force the reflected light from the target area to exit the cladding. Thus, instead of modifying the optical assembly 58 to allow the reflected light to "miss" the optical fiber scanning element 34, the optical assembly (not shown) of the embodiment in FIG. 6 allows the reflected light to be focused back into the optical fiber scanning element 34. Shortly after entering the optical fiber scanning element 34 (so as to reduce the amount of light absorbed by the cladding), the optical fiber scanning element 34 is modified to force the reflected light from the target area to exit the cladding of the optical fiber scanning element and thereafter be sensed by the detector assembly 44 within the housing 50.

In the illustrated embodiment, at least one portion along the length of the optical fiber scanning element is etched (e.g., profile modified). The profile modification typically thins the optical fiber scanning element 34 over some distance. A transition region 76 between an etched portion 72 and an un-etched portion 74 is typically sloped relative to a longitudinal axis 76 of the optical fiber scanning element 34. The angle of the slope of the transition region 70 allows light traveling inside the cladding to exit the optical fiber to allow it to be sensed by the detector assembly (not shown). As can be appreciated, a variety of other profile modifications of the optical fiber may achieve the same result of forcing the reflected light to exit the cladding. For example, instead of removing material from the cladding, material may be added to the outer surface of the cladding (e.g., one or more bumps).

FIGS. 7 and 8 schematically illustrate two methods that are encompassed by the present invention. As shown in FIG. 7, at step 80 a scanning beam device, such as an endoscope, is positioned adjacent the target area. Light is delivered from the scanning element (e.g., optical fiber with a core and cladding) through the optical assembly and onto the target area (step 82). Light is reflected from the target area back into the optical assembly (step 84). The optical assembly delivers a first portion of the light reflected from the target area onto the scanning element (step 86) and focuses or scatters a second portion of the light reflected onto the one or more detectors in the housing of the scanning beam device or scatters the second portion of the light reflected from the target area within the housing of the scanning beam device so that the second portion of the light reflected from the target area impinges on the one or more detectors in the housing of the scanning beam device (step 88).

As described above, the optical assembly is modified to change the optical characteristics so as to deliver the first portion of the light to the scanning element and the second portion of the light to the light detectors. The modification may be carried out by changing the shape or surface contour so that the reflected light scatters within the housing and/or is directed away from the scanning element. Such modifications include, but is not limited to, changing the shape of a portion of the optical assembly, frosting a portion of the optical assembly, changing a material of the optical assembly, adding a diffractive element to a portion of the optical assembly, or the like.

As shown in FIG. 8, in another method a scanning beam device is positioned adjacent the target area (step 90). Light is delivered from a distal end of the optical fiber through the optical assembly and over a target area (step 92). Light reflected from the target area is received back into the optical assembly, wherein the optical assembly focuses substantially all of the light reflected from the target area into the core (and cladding) of the optical fiber (step 94). Thereafter, the reflected light is forced or otherwise allowed to exit the cladding of the optical fiber so that it can be detected by the one or more detectors in the housing (step 96).

Figure 9:
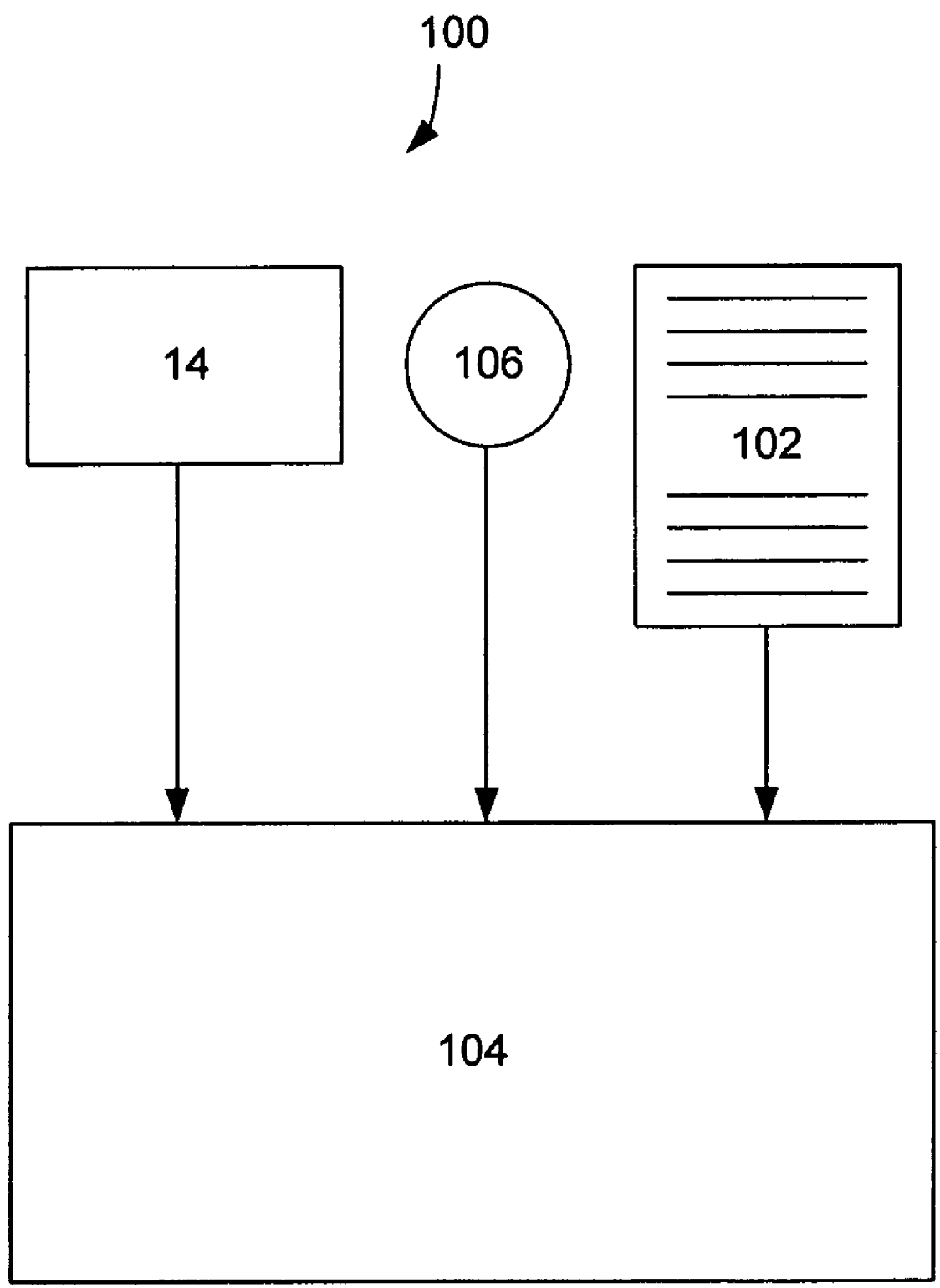
FIG. 9 schematically illustrates a kit encompassed by the present invention.

FIG. 9 illustrates a kit 100 encompassed by the present invention. The kit 100 may include a scanning beam device (SFD) 14 (such as an endoscope), instructions for use (IFU) 102, and at least one package 104. Optionally, the kit 100 may include a computer readable medium (CRM) 106 that is integral with the SFD 14 (such as a non-volatile memory) or separate from the SFD (e.g., CD, DVD, floppy disk, etc.)

The scanning fiber device 14 will generally be as described above, and the instruction for use (IFU) 102 will set forth any of the methods described herein. Package 104 may be any conventional device packaging, including pouches, trays, boxes, tubes, or the like. IFU 102 will usually be printed on a separate piece of paper, but may also be printed in whole or in part on a portion of the package 104.

It is understood that the examples and embodiments described herein are for illustrative purposes only and that various modifications or changes in light thereof will be suggested to persons skilled in the art and are to be included within the spirit and purview of this application and scope of the appended claims. Numerous different combinations are possible, and such combinations are considered to be part of the present invention.

What is claimed is:

1. A scanning beam device comprising:
    a drive assembly;
    a scanning element coupled to the drive assembly so that the scanning element moves and light emitted from the scanning element scans laterally;
    a housing that surrounds the drive assembly and the scanning element;
    one or more detectors positioned within the housing and spaced from the scanning element; and
    an optical assembly disposed substantially at a distal end of the housing assembly, the optical assembly adapted to direct the light from the scanning element to a target area distal of the optical assembly and adapted to direct at least a portion of light reflected from the target area to the one or more detectors;
    wherein the scanning element delivers a linearly polarized light to the target area so that the light reflected from the target area comprises multiple polarization states depending on the nature of the target area,
    wherein at least one element of the optical assembly comprises a birefringent material that directs light reflected from the target area that is of a first polarization to the scanning element and light reflected from the target area that is of a second polarization to the one or more detectors.

2. The device of claim 1 wherein the housing comprises a substantially tubular body and at least one detector is coupled to the substantially tubular housing.

3. The device of claim 1 wherein the one or more detectors are positioned within the housing and coupled to the optical assembly.

4. The device of claim 1 wherein the one or more detectors are positioned around the drive assembly.

5. The device of claim 1 wherein the one or more detectors are embedded into a portion of the optical assembly.

6. The device of claim 1 wherein the optical assembly comprises a first portion that is adapted to direct a first portion of the light reflected from target area to the scanning element, and a second portion that is configured to direct a second portion of the light reflected from the target area to the one or more detectors.

7. The device of claim 6 wherein the second portion of the optical assembly is adapted to scatter light within the housing or focus light away from the scanning element.

8. The device of claim 6 wherein the first portion of the optical assembly is a central area of the optical assembly around a longitudinal axis of the optical assembly and the second portion of the optical assembly is an annular area that surrounds at least a portion of the central area.

9. The device of claim 8 wherein the second portion of the optical assembly comprises an annular region of a distal most lens in the optical assembly.

10. The device of claim 6 wherein the second portion of the optical assembly is frosted so as to cause the light reflected from the target area to scatter within the housing.

11. The device of claim 6 wherein a shape of the second portion of the optical assembly is modified relative to the shape of the first portion of the optical assembly.

12. The device of claim 1 wherein the optical assembly comprises at least one diffractive element, wherein the at least one diffractive element directs at least a portion of light reflected from the target area to the one or more detectors.

13. The device of claim 1 wherein the scanning element comprises an optical fiber that comprises a core disposed within cladding.

14. The device of claim 1 wherein the device is an endoscope.

15. A method of scanning a target area, the method comprising:
    positioning a scanning beam device adjacent the target area, the scanning beam device comprising a housing that houses an optical assembly, a scanning element, and one or more detectors;
    delivering light from the scanning element through the optical assembly and onto the target area;
    moving the scanning element within the housing so as to scan the light laterally across the target area; and
    receiving light reflected from the target area back into the optical assembly,
    wherein the optical assembly delivers a first portion of the light reflected from the target area onto the scanning element and focuses a second portion of the light reflected onto the one or more detectors in the housing of the scanning beam device or scatters the second portion of the light reflected from the target area within the housing of the scanning beam device so that the second portion of the light reflected from the target area impinges on the one or more detectors in the housing of the scanning beam device;
    wherein delivering light comprises delivering linearly polarized light from the scanning element through the optical assembly,
    wherein the optical assembly comprises a birefringent material so that the first portion of the reflected light has the same polarization as the light delivered from the scanning element and the second portion of the reflected light has a perpendicular polarization to the first portion of the reflected light.

16. The method of claim 15 wherein delivering the first portion of the reflected light is carried out by delivering the first portion of the light reflected from the target area through a first portion of the optical assembly, and focusing/scattering the second portion of the light reflected from the target area is carried out by delivering the light reflected from the target area through a second portion of the optical assembly.

17. The method of claim 16 wherein the second portion of the optical assembly comprises a frosted surface or surface shape that differs from the first portion of the optical assembly.

18. The method of claim 16 wherein focusing/scattering is carried out by one or more diffractive elements in the second portion of the optical assembly.

19. The method of claim 16 comprising embedding one or more detectors into the second portion of the optical assembly.

20. The method of claim 15 wherein the scanning element comprises an optical fiber that comprises a core disposed within cladding.

21. The method of claim 15 wherein the scanning beam device is an endoscope.

22. A scanning beam device comprising:
an optical fiber comprising a core and cladding;
a drive assembly coupled to the optical fiber;
a housing that surrounds the drive assembly and the optical fiber;
one or more detectors positioned within the housing and spaced from the optical fiber to detect light that is allowed to leave the core and cladding of the optical fiber; and
an optical assembly disposed substantially at a distal end of the housing assembly, the optical assembly configured to direct light reflected from the target area to the core of the optical fiber.

23. The device of claim 22 wherein the one or more detectors are positioned within the housing proximal to the optical assembly.

24. The device of claim 22 wherein at least a portion of the optical fiber is etched to allow light to exit the cladding.

25. The device of claim 24 wherein the optical fiber comprises a sloped transition region between an etched portion of the optical fiber and an un-etched portion of the optical fiber.

26. The device of claim 25 wherein a slope of the transition region is angled relative to a longitudinal axis of the optical fiber.

27. The device of claim 22 wherein the device is an endoscope.

28. A method of scanning a target area, the method comprising:
positioning a scanning beam device adjacent the target area, the scanning beam device comprising a housing that houses an optical assembly, an optical fiber comprising a core and cladding, and one or more detectors;
delivering light from a distal end of the optical fiber through the optical assembly and over a target area; and
receiving light reflected from the target area back into the optical assembly, wherein the optical assembly focuses substantially all of the light reflected from the target area into the core of the optical fiber,
allowing the reflected light to exit the cladding and core of the optical fiber so that it can be detected by the one or more detectors in the housing.

29. The method of claim 28 wherein the optical fiber is etched to allow light to exit the cladding.

30. The method of claim 29 wherein the etched optical fiber comprises a sloped transition region between an etched portion of the optical fiber and an un-etched portion of the optical fiber.

31. The method of claim 30 wherein a slope of the transition region is angled relative to a longitudinal axis of the optical fiber.

32. The method of claim 28 wherein the scanning beam device is an endoscope.

* * * * *